United States Patent
Dotzler et al.

(10) Patent No.: US 6,664,765 B2
(45) Date of Patent: Dec. 16, 2003

(54) LITHIUM-ION BATTERY CHARGER POWER LIMITATION METHOD

(75) Inventors: Kevin Dotzler, San Diego, CA (US); Keisaku Hayashi, Carlsbad, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/061,841

(22) Filed: Jan. 30, 2002

(65) Prior Publication Data

US 2003/0141850 A1 Jul. 31, 2003

(51) Int. Cl.$^7$ .................................................. H02J 7/04
(52) U.S. Cl. ........................................ 320/162; 320/152
(58) Field of Search .............................. 320/162, 163, 320/164, 137, 152, 157, 134, 136; 361/79, 86, 87, 21

(56) References Cited

U.S. PATENT DOCUMENTS 6,057,666 A * 5/2000 Dougherty et al. .......... 320/104
6,118,254 A * 9/2000 Faulk ........................ 320/141

* cited by examiner

Primary Examiner—Michael Sherry
Assistant Examiner—Lawrence Luk
(74) Attorney, Agent, or Firm—Harness, Dickey & Pierce, PLC

(57) ABSTRACT

A method of charging a battery from a power source is provided. The method includes providing a charge circuit in series with the battery and the power source. A charging current flowing to the battery and a voltage across the charge circuit are sensed. The power dissipated in the charge circuit is computed based on the charging current and the voltage across the charge circuit. During a first operating mode, the charging current is controlled so that the power dissipated in the charge circuit is about a predetermined maximum dissipation. During a second operating mode, the charging current is limited to a predetermined current level. During a third operating mode, the charging current is controlled so that the battery voltage is about a predetermined voltage level.

14 Claims, 3 Drawing Sheets

LITHIUM-ION BATTERY CHARGER POWER LIMITATION METHOD

TECHNICAL FIELD

This invention relates to wireless communications devices, and more particularly to lithium-ion battery chargers for wireless communications devices.

BACKGROUND

Conventional battery chargers for wireless communications devices typically charge a battery using a two-step charging process. Initially, a constant current is supplied to the battery. Once the battery voltage increases to a predetermined level, the charging current into the battery is permitted to vary while the battery voltage is held constant. The battery charger includes charge control components that typically vary a controlled impedance in series with the battery to control the charging of the battery.

A problem with conventional battery chargers is that the controlled impedance may dissipate an excessive amount of power during the early stages of constant current charging, depending on the discharge state of the battery. A discharged battery has a relatively low terminal voltage compared to a fully charged battery. Therefore, during the early stages of constant current charging a higher voltage is impressed across the controlled impedance, resulting in increased dissipation. The increased dissipation leads to reduced reliability and possible failure of the controlled impedance.

SUMMARY

A method of charging a battery from a power source is provided. The method includes providing a charge circuit in series with the battery and the power source. A charging current flowing to the battery and a voltage across the charge circuit are sensed. The power dissipated in the charge circuit is computed based on the charging current and the voltage across the charge circuit. During a first operating mode, the charging current is controlled so that the power dissipated in the charge circuit is about a predetermined maximum dissipation. During a second operating mode, the charging current is limited to a predetermined current level. During a third operating mode, the charging current is controlled so that the battery voltage is about a predetermined voltage level.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
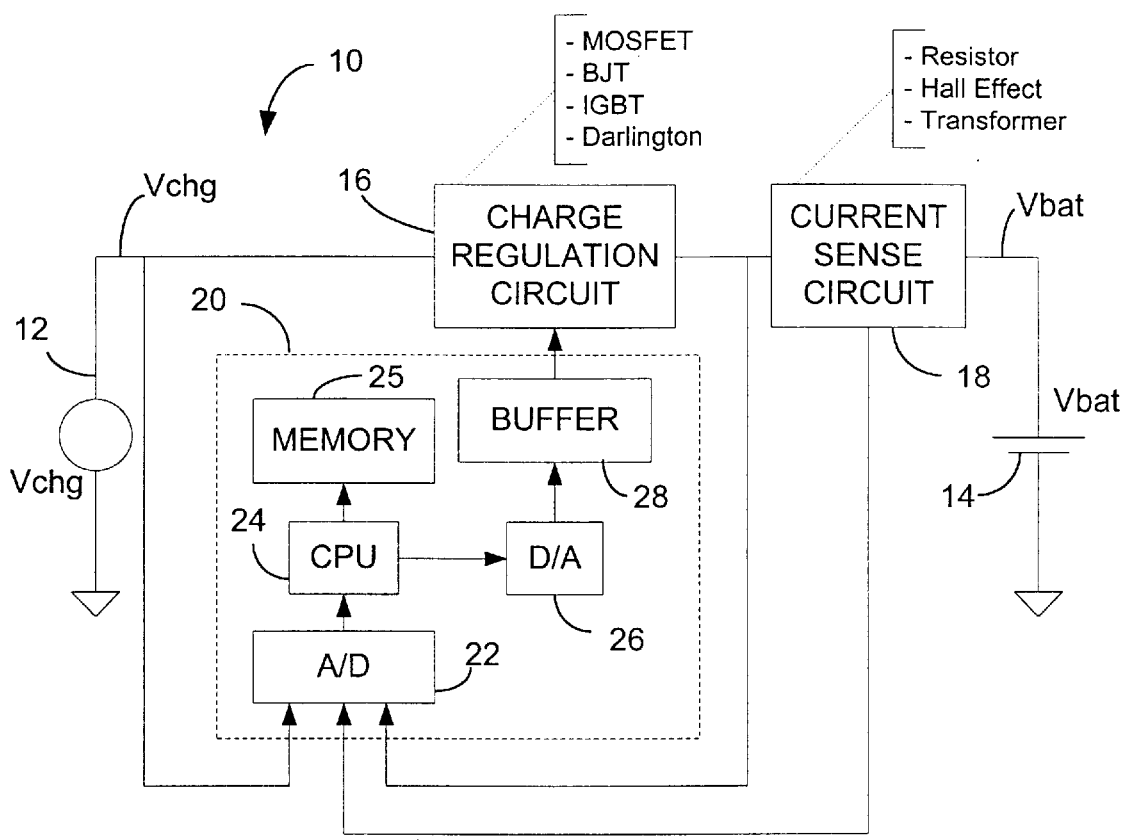
FIG. 1 illustrates a block diagram of an embodiment of a battery charger in accordance with the principles of the invention.

Referring to FIG. 1, a battery charger 10 in accordance with the principles of the invention is shown. The battery charger 10 controls the flow of a charging current from a power source 12 to a battery 14. The battery charger 10 provides at least two operating modes with a closed loop control scheme to control dissipation in the charging components while minimizing the charge time of the battery 14.

A charge regulation circuit 16 having a controllable impedance connected in series with the power source 12 and battery 14 controls the flow of charging current in response to a charge control signal. Increasing the impedance of the charge regulation circuit 16 causes a decrease in the flow of charging current. Likewise, decreasing the charge regulation circuit impedance causes an increase in the charging current. The charge regulation circuit 16 may be any controllable switch such as PNP and NPN BJTs, MOSFETs, integrated gate bipolar transistors (IGBTs), and modulation conductivity transistors (MCTs).

A current sense circuit 18 connected in series with the battery 14 generates a current sense signal that is representative of the current flowing through the battery 14. Those skilled in the art will recognize that the current sense circuit 18 may also be connected in series with either the charge regulation circuit 16 or the power source 12 to change the impact of errors in the current measurement caused by shunt currents flowing to peripheral circuits. The current sense circuit may be any circuit for sensing current such as a resistor, a Hall effect device, and a magneto-resistive circuit.

A control circuit 20 generates the charge control signal for controlling the charge regulation circuit 16. The control circuit 20 generates the charge control signal based on the sensed current and the voltage across the charge regulation circuit 16. A detailed description of the control scheme implemented in the control circuit 20 will be presented in a later section of this specification.

In one embodiment, the control circuit 20 is implemented in a digital circuit including an A/D 22, a CPU 24, a memory 25, a D/A 26, and a buffer 28. Those skilled in the art will recognize that the control circuit may also be implemented in other types of circuits such as analog and mixed signal circuits.

The A/D 22 converts the sensed signals representing voltages and currents to digital signals to be processed by the CPU 24. The sensed signals include the current sense signal and the voltage signals representing the charging voltage from the power source 12 and the battery voltage. Instead of digitizing both voltage signals, a differential amplifier may be used to combine the charging voltage signal and the battery voltage signal into a charge circuit signal that represents the voltage across the charge regulation circuit 16. The charge circuit signal is then converted to a digital signal.

The CPU 24 executes a series of instructions stored in the memory 25 to implement the control scheme and generate a digital control signal. The CPU 24 may be any known processor such as uProcessors and uControllers.

The D/A 26 uses well known techniques to convert the digital control signal to an analog signal that is suitable for driving the charge regulation circuit 16. A buffer 28 may optionally be coupled between the D/A 26 and the charge regulation circuit 16 to provide voltage level shifting or decreased source impedance to improve circuit response.

Figure 2:
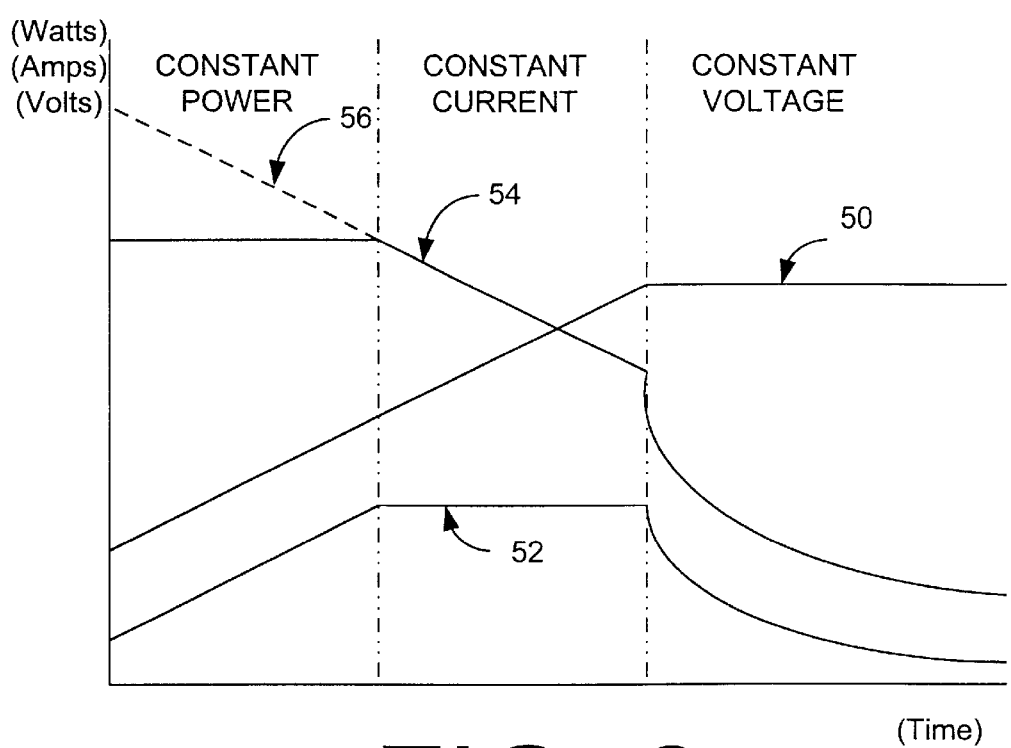
FIG. 2 illustrates waveforms associated with an embodiment of a battery charger in accordance with the principles of the invention.

Referring to FIG. 2, waveforms associated with an embodiment of the invention are shown. A voltage waveform 50 shows the battery voltage increasing as the battery is charged from the discharged state to a charged state. The voltage across the charge regulation circuit 16 is approximately equal to the charging voltage minus the battery voltage (neglecting losses in the current sense circuit 18 and interconnect losses). Since the charging voltage is about constant, when the battery voltage is at a minimum voltage, the voltage across the charge regulation circuit 16 is at a maximum. A current waveform 52 shows the current flowing through the battery 14. A power waveform 54 shows the power dissipated in the charge regulation circuit 16. The power dissipated is equal to the current flowing through the charge regulation circuit 16 times the voltage across the voltage regulation circuit 16. A dashed waveform 56 illustrates the power dissipation in the charge regulation circuit of conventional battery chargers. As depicted by the waveforms 50–54, there are three operating modes in the illustrated embodiment; a constant power mode followed by a constant current mode and a constant voltage mode.

During constant power mode the power dissipated in the charge regulation circuit 16 is limited to a predetermined power level such as the maximum allowed dissipation in the charge regulation circuit 16 or a lower power level at which heating of the battery charger 10 is reduced to enhance user comfort when the battery charger 10 is included in an assembly such as a wireless device. The charge regulation circuit power dissipation is limited by operating the charge regulation circuit 16 in the active region to vary the impedance in series with the power source 12 and battery 14, which controls the flow of current to the battery 14. When the power dissipated in the charge regulation circuit 16 decreases to less than the predetermined power level, the battery charger 10 transitions into constant current mode.

During constant current mode, the current flowing through the battery 14 is regulated to a predetermined maximum current level that is a function of the battery charge characteristics such as ambient temperature, battery size, and battery type. Once the battery voltage increases to the steady-state voltage level, the battery charger transitions to the constant voltage mode.

During constant voltage mode, the amount of charge current is controlled to maintain a relatively constant voltage across the battery 14. The battery charger 10 remains in constant voltage mode as long as the battery 14 is attached or until a load is impressed on the battery 14 causing the battery voltage to decrease to less than the steady-state voltage.

Figure 3:
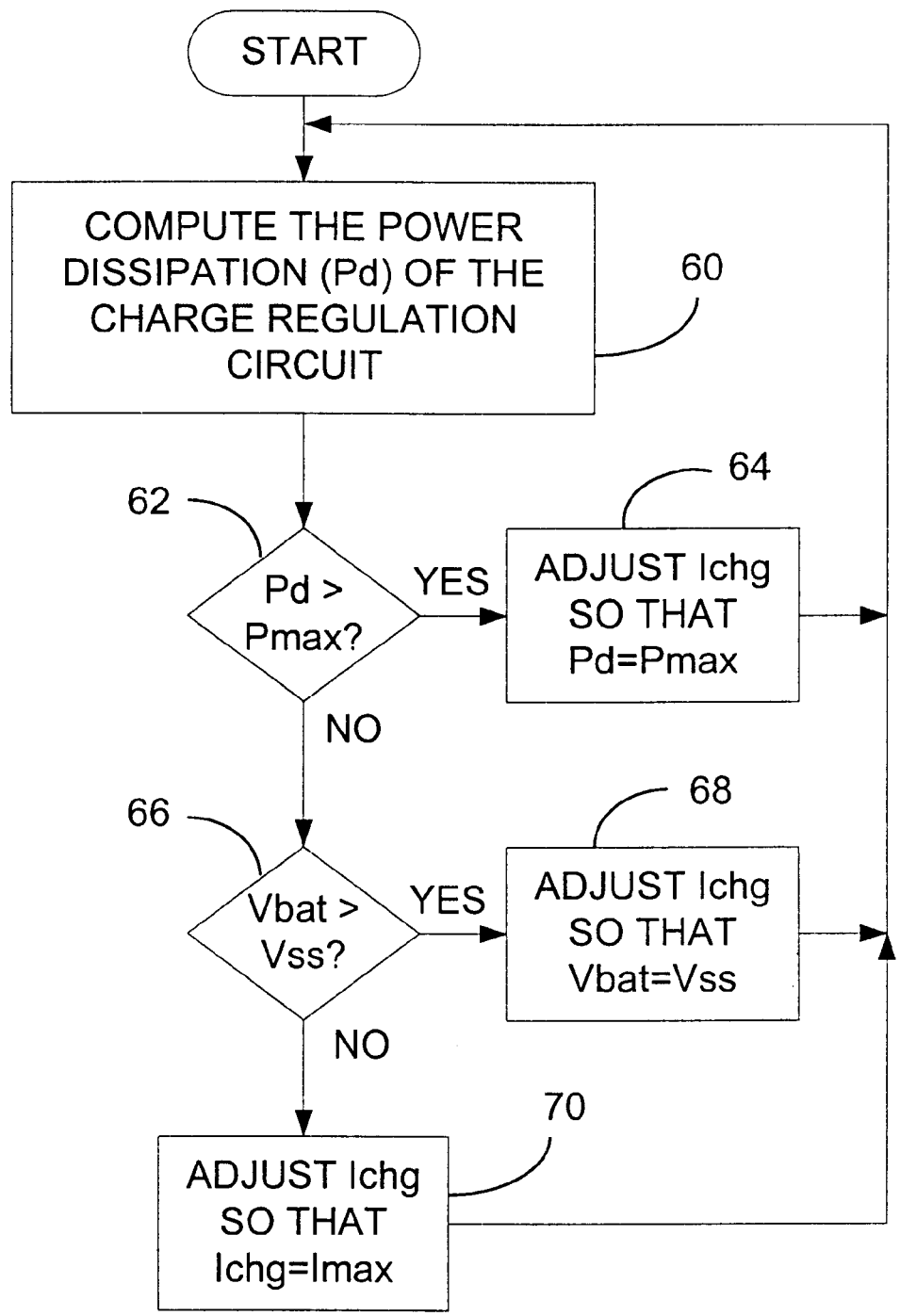
FIG. 3 illustrates a method of charging a battery in accordance with the principles of the invention.

Referring to FIG. 3, an operating process of an embodiment of the invention is shown. Beginning at state 60, the approximate power dissipation, Pd, of the charge regulation circuit 16 is computed from the battery current and Vchg minus Vbat. Continuing on to state 62, the computed power dissipation is compared to the predetermined maximum power dissipation level. If the computed power dissipation is greater than Pmax, the battery charger 10 operates in constant power mode. In constant power mode, the process proceeds to state 64 where the charging current, Ichg, is adjusted so that Pd approximately equals Pmax. The process then returns to state 60 to again compute the power dissipation in the charge circuit 16. The process remains in the constant power mode loop until Pd is less than Pmax.

Returning to state 62, when Pd is less than the predetermined maximum power dissipation level, the process continues on to state 66. At state 66 the battery voltage, Vbat, is compared to the predetermined steady-state voltage level, Vss. If the battery voltage is greater than Vss, the battery charger 10 operates in constant voltage mode. In constant voltage mode, the process continues on to state 68, in which the charging current, Ichg, is adjusted so that Vbat approximately equals Vss. The process then returns to state 60 to again compute the power dissipation in the charge circuit 16.

The process remains in constant voltage looping through states 60, 62, 66, and 68 until Vbat is less than Vss.

Returning to state 66, if Vbat is less than Vss, the battery charger 10 operates in the constant current mode. In constant current mode, the process continues on to state 70. In state 70 the charging current is controlled to be approximately equal to the predetermined maximum charging current, Imax. The process remains in constant current, looping through steps 60, 62, 66, and 70 until either the Pd is greater than Pmax, or Vbat is greater than Vss.

A number of embodiments of the invention have been described. Nevertheless, it will be understood that various modifications may be made without departing from the spirit and scope of the invention. In particular, those skilled in the art will recognize that the steps of the process may be interchanged as well as executed in parallel. Accordingly, other embodiments are within the scope of the following claims.

What is claimed is:

1. A method of charging a battery from a power source, comprising:

providing a charge circuit in series with the battery and the power source;

sensing a charging current flowing to the battery;

sensing a voltage across the charge circuit;

computing power dissipated in the charge circuit based on the charging current and the voltage across the charge circuit;

during a first operating mode, controlling the charging current such that the power dissipated in the charge circuit is about a predetermined maximum dissipation;

during a second operating mode, limiting the charging current to a predetermined current level; and during a third operating mode, controlling the charging current such that a terminal voltage of the battery is about a predetermined voltage level.

2. The method of claim 1 wherein sensing the voltage across the charge circuit includes sensing a voltage level of the battery and a voltage level of the power source.

3. The method of claim 2, further comprising:

digitizing signals representing the charging current and the voltage across the charge circuit;

generating a digital control signal based on processing the digitized signals; and converting the digital control signal to an analog control signal for controlling the charge circuit.

4. The method of claim 3 wherein the predetermined maximum dissipation is based on the operating characteristics of the charge circuit.

5. A battery charger for charging a battery from a power source, comprising:

a charge circuit in series with the power source and the battery, the charge circuit, controllable in response to a charge control signal, to control charging current flowing between the battery and the power source;

a current sense circuit in series with the battery, to generate a current sense signal representative of the charging current; and a control circuit to generate the charge control signal in response to the current sense signal and a first voltage signal representative of voltage across the charge circuit, the control circuit including at least two operating modes;

during a first mode of the at least two operating modes, controlling the charging current such that the power dissipated in the charge circuit is about a predetermined maximum dissipation in response to the charge control signal computed by using the current sense signal and the first voltage signal; and during a second mode of the at least two operating modes, limiting the charging current to a predetermined current level.

6. The battery charger of claim 5 wherein the charge circuit is selected from the group of PNP transistors, P-channel MOSFETs, NPN transistors, and N-channel MOSFETs.

7. The battery charger of claim 6 wherein the current sense circuit is selected from the group of current sense resistors, Hall effect devices, and magneto-resistive circuits.

8. The battery charger of claim 7 wherein the control circuit includes:

an A/D to digitize the current sense signal and the first voltage signal;

a CPU to generate a digital control signal computed form the digitized current sense signal and first voltage signal; and a D/A to convert the digital control signal to the charge control signal.

9. The battery charger of claim 8 wherein the control circuit further includes a buffer coupled between the D/A and the charge circuit.

10. The battery charger of claim 7 included within a wireless device.

11. The battery charger of claim 10 wherein the wireless device is a cellular phone.

12. The battery charger of claim 5 further including a differential amplifier to generate the first voltage signal from a second voltage signal representative of the power source voltage and a third voltage signal representative of the battery voltage.

13. A battery charger for charging a battery from a power source, comprising:

a charge circuit in series with the power source and the battery, the charge circuit, controllable in response to a charge control signal, to control charging current flowing between the battery and the power source;

a current sense resistor in series with the battery, to generate a current sense signal representative of the charging current;

a control circuit to generate the charge control signal in response to the current sense signal and a first voltage signal representative of voltage across the charge circuit, the control circuit including;

an A/D to digitize the current sense signal and the first voltage signal;

a CPU to generate a digital control signal computed form the digitized current sense signal and first voltage signal;

a D/A to convert the digital control signal to an analog signal; and a buffer coupled between the D/A and the charge control circuit to generate the charge control signal from the analog signal;

the control circuit having at least two operating modes;

during a first mode of the at least two operating modes, controlling the charging current such that the power dissipated in the charge circuit is about a predetermined maximum dissipation; and during a second mode of the at least two operating modes, limiting the charging current to a predetermined current level.

14. The battery charger of claim 13 further including a differential amplifier to generate the first voltage signal from a second voltage signal representative of the power source voltage and a third voltage signal representative of the battery voltage.

* * * * *